United States Patent
Xia et al.

(10) Patent No.: US 9,326,089 B2
(45) Date of Patent: Apr. 26, 2016

(54) PASSENGER CASTED CONTENT TO INFOTAINMENT SYSTEM

(71) Applicant: Google Inc., Mountain View, CA (US)

(72) Inventors: Lily Xia, Sydney (AU); Nicholas Julian Pelly, Manly (AU)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/312,883

(22) Filed: Jun. 24, 2014

(65) Prior Publication Data

US 2015/0373479 A1   Dec. 24, 2015

(51) Int. Cl.
*G06F 17/00* (2006.01)
*H04W 4/00* (2009.01)
*H04M 1/725* (2006.01)
*H04W 4/04* (2009.01)

(52) U.S. Cl.
CPC .......... *H04W 4/005* (2013.01); *H04M 1/72569* (2013.01); *H04M 1/72577* (2013.01); *H04W 4/008* (2013.01); *H04W 4/046* (2013.01)

(58) Field of Classification Search
CPC ...... H04L 67/12; H04L 67/306; B60K 35/00; H04W 4/008; H04W 4/046; H04W 76/021; G01C 21/36; G01C 21/3688; H04M 1/72577; H04M 1/72569
USPC .......................... 701/2, 36, 538; 455/39, 41.2
See application file for complete search history.

(56) References Cited

U.S. PATENT DOCUMENTS

| | | | |
|---|---|---|---|
| 2011/0093136 A1 | 4/2011 | Moinzadeh et al. | |
| 2012/0221188 A1* | 8/2012 | Kelly, III | 701/29.1 |
| 2013/0157647 A1 | 6/2013 | Kolodziej et al. | |
| 2014/0163771 A1* | 6/2014 | Demeniuk | H04B 1/082 701/2 |
| 2014/0179276 A1* | 6/2014 | Kang | H04W 4/008 455/411 |

OTHER PUBLICATIONS

International Search Report and Written Opinion issued Dec. 3, 2015 in corresponding International Application No. PCT/US2015/036673., 10.

* cited by examiner

*Primary Examiner* — Adam Tissot
(74) *Attorney, Agent, or Firm* — Morris & Kamlay LLP

(57) ABSTRACT

A projected architecture system may include a first device, associated with a driver of a vehicle, which drives the display of content on the infotainment screen of the vehicle. A passenger in the motor vehicle may have a second device that the passenger can utilize to transmit an instruction to the first device. The instruction may cause the display of the infotainment system to be altered. The passenger may, for example, utilize the second device to cast a point of interest or navigation direction to the infotainment display via the first device. Thus, the driver does not need to search, browse, and/or view functions and/or content on the infotainment system's display and can concentrate on operating the vehicle.

21 Claims, 4 Drawing Sheets

PASSENGER CASTED CONTENT TO INFOTAINMENT SYSTEM

BACKGROUND

A vehicle infotainment system may be integrated with the vehicle or operate in a projected mode in which a separate computing device drives display of content on the infotainment system's screen. The separate computing device may receive sensor data from the vehicle including data regarding the vehicle's performance and whether the vehicle has any buttons, knobs, and/or a touchscreen to interface with the infotainment system. In some configurations, the computing device may be a mobile phone. While the motor vehicle is moving, the mobile phone may not be capable of receiving user input directly; instead, a user may be required to utilize the infotainment system's user interface in order to avoid distracting the driver.

BRIEF SUMMARY

According to an implementation, a safety condition of a vehicle may be determined. At least one function of a first device associated with a driver of a vehicle may be disabled based on the safety function. The first device may be connected to the infotainment system of the vehicle. A request may be received from a second device to provide an instruction to the first device. The second device may be determined to have permission to provide the instruction to the first device. The instruction may be received from the second device. The first device may control the infotainment system according to the instruction received from the second device.

In an implementation, a second device may send a credential to a first device that the first device uses to authenticate the second device to the first device. The first device may be communicatively coupled to a vehicle and be responsible for driving a display of an infotainment system. The first device may be associated with a driver of the vehicle and the second device may be associated with a passenger of the vehicle. An indication may be received that the second device is authenticated to the first device. An instruction may be sent to the first device. The instruction may cause the first device to control the display of the infotainment system.

A system is disclosed that includes a first device. The first device may have a processor, a display, and other hardware suitable for the implementations disclosed herein. The first device may be communicatively coupled to a vehicle. It may be responsible for driving a display of an infotainment system. The first device may be associated with a driver of the vehicle. The processor may be configured to determine a safety condition of the vehicle. It may disable one or more functions of the first device based on the safety condition. The processor may receive a request from a second device to provide an instruction to the first device. The second device may be associated with a passenger of the vehicle. The processor may determine that the second device has permission to provide the instruction to the first device. An instruction may be received from the second device. The processor may be configured to control the display of the infotainment system based on the instruction received from the second device.

In an implementation, a system according to the presently disclosed subject matter includes a first device with a display and a processor. The first device may have a means for driving a display of an infotainment system connected to a vehicle. The first device may be associated with a driver of the vehicle. The system may include a means for determining a safety condition of the vehicle and disabling one or more functions of the first device based on the safety condition. The system may include a means for receiving a request from a second device to provide an instruction to the first device. The second device may be associated with a passenger of the vehicle. The system may have a means to determine that the second device has permission to provide the instruction to the first device. The system may include a means for receiving the instruction from the second device and to control the display of the infotainment system based on the instruction received from the second device.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Searching for an address or point of interest on an infotainment system of a vehicle can be cumbersome and dangerous for a driver of the vehicle. The driver may be utilizing a computing device such as a smartphone or tablet to drive the display of the infotainment system in a projected architecture system. The projected architecture system may, for the driver's safety, lock the computing device while it is connected to the infotainment system of the motor vehicle and the vehicle is in motion. In a locked state, the computing device may not receive input from the user except through the infotainment system's touchscreen, buttons, knobs, etc. For example the touchscreen of the mobile device driving the infotainment system's display may be disabled while the mobile device is connected to the vehicle. In some instances, a driver may have a passenger in the vehicle who can search, using the passenger's computing device, for an address, a point of interest, or other content to be displayed on the infotainment system. As disclosed herein, a passenger may, for example, cast an address from the passenger's smartphone (e.g., a second device) to a mobile device associated with the driver of the vehicle (e.g., a first device). The driver's mobile device, upon determining that the passenger's device has permission to provide instruction to the driver's device, may change the destination of a navigation application operating on the driver's device to the address casted by the passenger's device. Thus, the driver does not need to input, search, view, browse, and/or select a destination while driving.

Figure 1:
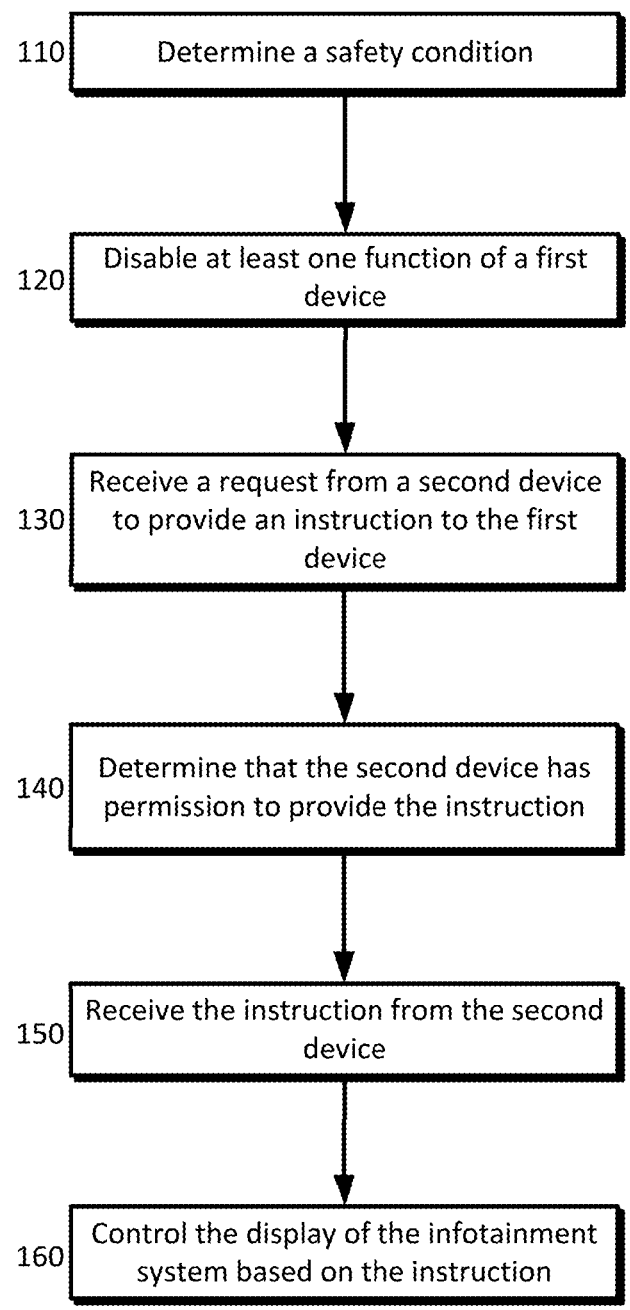
FIG. 1 shows an example process for controlling the display of an infotainment system by a first device using an instruction received from a second device as disclosed herein.

An example of a process as disclosed herein is shown in FIG. 1. The first device (e.g., a smartphone, a tablet, a laptop) may be associated with the driver of the vehicle. The first device may be connected to the vehicle and be responsible for driving a display of an infotainment system. The first device may be a component of a projected architecture system. In such a system, the first device may operate an instance of one or more applications that provide functionality to the vehicle's infotainment system. The infotainment system may include a display that may be touch sensitive, include one or more virtual or physical buttons, and have one or more knobs. Upon connecting the first device to the motor vehicle and/or infotainment system, the infotainment system may provide the first device with an indication of the controls available for the particular vehicle. For example, the vehicle may only have a touchscreen. Similarly, different vehicles may have different functions that can be controlled by the infotainment system. For example, air conditioning of the vehicle may be controlled by a touchscreen in one vehicle and controls separate from the infotainment system in another.

The infotainment system may be physically integrated with the motor vehicle and may not be easily separable from the vehicle dashboard, for example. Alternatively, the infotainment system may be a standalone device that can be separated from the motor vehicle during use of the vehicle. For example, it may be a portable navigation unit or a portable display that a user can remove from the vehicle with ease. A portable navigation unit typically has a car mount into which it snaps and the mount may provide a quick release mechanism.

A first device may determine a safety condition of a vehicle at 110. The first device may control the display of the infotainment system in response to user input with the infotainment system's user interface. The first device may cause, for example, text messages to be displayed on the infotainment system or allow a driver to send and receive telephone calls. The first device may be connected to the motor vehicle utilizing a variety of technologies such as by a wired protocol (e.g., USB) and/or a wireless protocol (e.g., Bluetooth). While the first device is connected to the vehicle and/or handling the operation of the infotainment system's function (e.g., driving the display of the infotainment system and/or responding to user input into the infotainment system), the device may determine that a safety condition may exist. Operating a mobile device, for example, while driving a motor vehicle can be dangerous. A safety condition may refer to when a user connects the first device to the vehicle, when the vehicle is moving or above a preset speed (e.g., 5 mph), when the first device is driving the infotainment system's display, when a parking brake is disengaged, when a car is not in park, or any combination thereof. The first device may be configured to detect other safety conditions as well.

One or more functions of the first device may be disabled based on the determined safety condition at 120. For example, the touchscreen of the first device may be disabled while the safety condition exists (e.g., while the first device is connected to the vehicle). Other functions of the device may be suppressed such as receiving a telephone call or sending/receiving text messages on the first device. The first device, however, may continue to provide a suppressed or disabled function via the infotainment system. For example, a phone call may be suppressed on the mobile device, but it may be provided utilizing microphones and/or speakers of the vehicle through the infotainment system.

A request from a second device (e.g., a smartphone, tablet, and laptop) may be received at 130. The second device may be requesting to provide an instruction to the first device. A driver may select one or more users whose devices may have permission to cast a screen or otherwise provide an instruction to the first device. For example, when the passenger's device (e.g., the second device) transmits an instruction to the first device, the first device may cause a prompt to appear on the infotainment display. The prompt may alert the driver (e.g., operator of the first device) that a second device is attempting to alter or control the display. The prompt may ask whether the driver would like to grant permission to the device providing the instruction. The prompt may display other information about the second device and/or user of the second device. For example, the second device may be associated with a particular user account. The prompt may show the user name associated with the user account of the second device. When the second device is connected to the first device or otherwise provides an instruction to the first device, the first device and/or the vehicle's infotainment system may provide an audible or visual indication. For example, the vehicle's speakers may be directed, by the first device, to emit a tone or generate an audible, synthetic voice message when the second device transmits an instruction. The voice message can include a description of the signal from the passenger laptop.

In some configurations, a user may input into the first device other users who may provide instructions to it while the first device is operating in a projected architecture. The first device may receive one or more credentials from devices that are authorized to provide instructions to the first device. When the first device receives an instruction from the second device, the instruction may be accompanied by one or more credentials that can be compared to those previously received. If the one or more credentials match, then the instruction may be permitted by the first device. Thus, the second device may be determined to have permission to provide instruction to the first device at 140 using a variety of mechanisms. The level of access provided to the second device may be configured on a per device basis. For example, one device may be permitted to access locally stored files on the first device and have access to the full functionality of the first device. Another device may be permitted only to provide points of interest when the first device is operating a navigation application (e.g., the infotainment system is providing navigation for the vehicle).

In the event that the second device and/or user has authority to provide instructions to the first device, the first device may activate a sharing mode that grants that second the ability to control one or more applications on the first device. For example, the instruction may cause a video game application to be launched. The second device may be utilized to play the game, on the infotainment system's display, through the first device. For example, the second device may relay data from the second device's inertial measurement unit as user input for the game being played via the first device. Thus, if the user of the second device tilts the second device ninety degrees to the right, it may cause a car in a racing game to make a sharp turn to the right. Similarly, the first device may transmit data to the second device. Continuing the racing game example, if the user makes an in-game achievement, the indication of the achievement may be sent to the second device such that when the user of the second device launches the game application locally, it will reflect the achievement.

The instruction from the second device may be received by the first device at 150. An instruction may refer to, for example, a URL, an address, a location, an application launch, a point of interest, and a user interface command. A user (such as a passenger) of the second device (such as the passenger's tablet) may perform a query on the second device for a point of interest (e.g., a landmark, a restaurant, a movie theatre, a hotel, etc.). Upon finding a point of interest, the user may direct the second device to transmit (or "cast") a URL, the name of the point of interest, the location (e.g., GPS coordinates) of the point of interest, etc. to the first device (e.g., the driver's mobile device that is connected to the infotainment system). The second device may, for example, have an application, plug-in, or other process, that is responsible for its casting function. For example, a plug in for a web browser (or other application) operating on the second device may display an icon in the menu bar of the browser. When the user selects the icon, it may trigger the casting function of the second device. The casting function may transmit, in the case of a web browser, the URL the browser is currently viewing to the first device as an instruction. If the application is operating on the second device is a navigation application, selecting the casting button or otherwise triggering the casting function, may cause the second device to transmit GPS coordinates to the first device. As another example, the second user may be playing a video game or viewing a movie on the second device. If the casting function is triggered on the second device, it may cause the first device to launch the corresponding game application or video viewing application, if the first device has and permits such applications and/or functionality.

Returning to FIG. 1, the first device may control the display of the infotainment system based on the instruction received from the second device at 160. The instruction may, for example, change the destination of a navigation application from a first location to a second location. The second location may have been provided or extrapolated based on the instruction received from the second device. The system may be configured such that a deviation from the first location suggested by the second device may need to be accepted by the driver (e.g., via a button on the infotainment system) or otherwise confirmed. Adjusting the display may refer to having the first device execute an application that is different from one currently displayed on the infotainment system and/or changing the state of the application currently being shown on the display. For example, the infotainment system's display may be adjusted from a navigation interface to a movie interface or from showing only a navigation interface to showing the navigation interface concurrently with a phone contacts list. As another example, a navigation application may be directed to show nearby points of interest or to change the destination.

Figure 2:
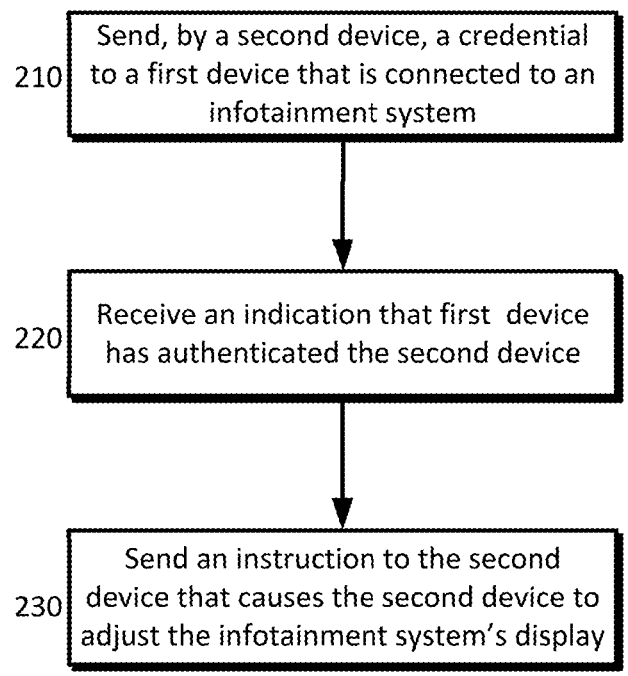
FIG. 2 is an example process for authenticating a second device to a first device to allow the second device to cast an instruction to the first device according to an implementation.

FIG. 2 is an example of an implementation in which a second device (e.g., belonging to a passenger of a vehicle) may send one or more credentials to a first device (e.g., associated with a driver of the vehicle) that the first device may utilize to authenticate the second device to the first device at 210. For example, the second device may send a device identification or user name that is associated with the second device to the first device. As described above, the first device may compare the received credential to those established earlier. The first device may be connected to an infotainment system of a vehicle and be responsible for driving the display of the infotainment system's display. The second device may receive an indication that it is authenticated to the first device at 220. For example, the second device may display a notice that indicates that the first device is in proximity to the second device and/or that the first device is connected to the infotainment system of the motor vehicle. The second device may send an instruction to the first device that causes the first device to control the display of the infotainment system at 230 according to the instruction provided by the second device as described above.

Figure 3:
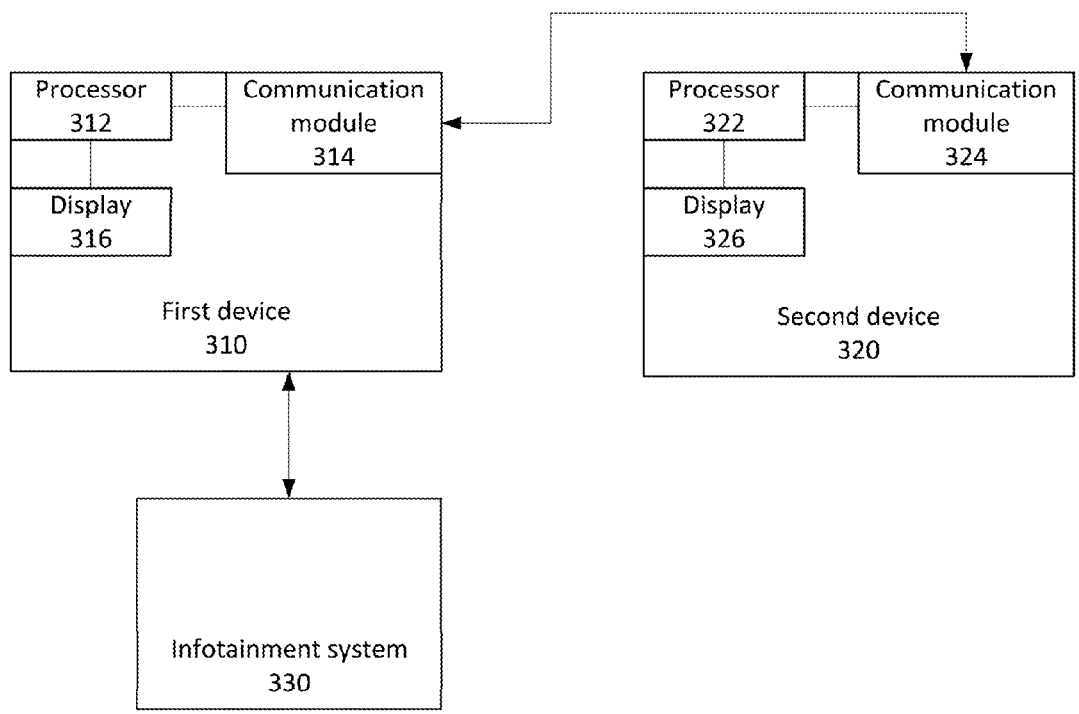
FIG. 3 shows an example system for adjusting the display of an infotainment system by a first device using an instruction received from a second device as disclosed herein.

A system is provided that may include a first device 310, a second device 320, and an infotainment system 330 as shown by the example in FIG. 3. The first device 310 may include a processor 312, display 316, and a communication module 314. The communication module 314 may refer to a physical connection between the motor vehicle (e.g., the infotainment system 330) and the first device 310. The communication module 340 may negotiate wireless communication between the first device 310 and the second device 320. It may also handle connection of the first device to the infotainment system 330. The second device 320 may have a processor 322, display 326, and communication module 324 of its own. The infotainment system 330 may have a display and/or one or more buttons or knobs as described earlier. The first device 310 may be associated with a driver of a vehicle and be responsible for driving the display of the infotainment system 330. The first device's processor 312 may be configured to determine a safety condition of the vehicle as described above and one or more functions of the first device 310 may be disabled based on the safety condition. Once the safety condition is removed (e.g., the car is parked or the first device 310 is disconnected from the vehicle), then the functions that were disabled and/or suppressed may be returned to their ordinary operation. The processor 312 may receive a request from the second device 320 to provide an instruction. The second device 320 may be determined to have permission to provide the instruction by the first device 310. The processor 312 may be configured to receive an instruction from the second device 320 control the display of the infotainment system based on the instruction received form the second device 320 as described earlier.

Figure 4:
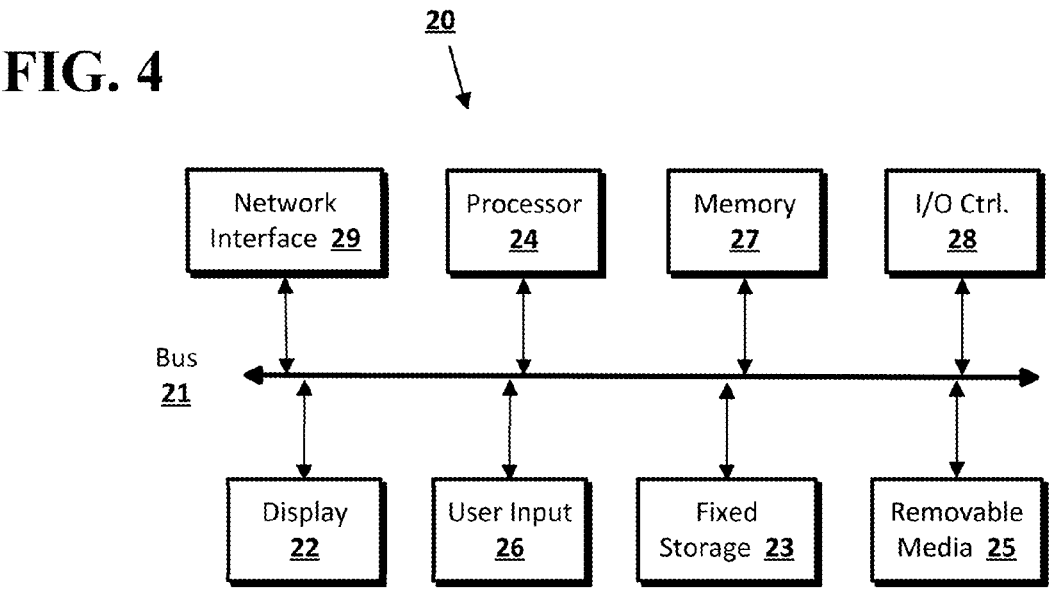
FIG. 4 shows a computer according to an implementation of the disclosed subject matter.

Implementations of the presently disclosed subject matter may be implemented in and used with a variety of component and network architectures. FIG. 4 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
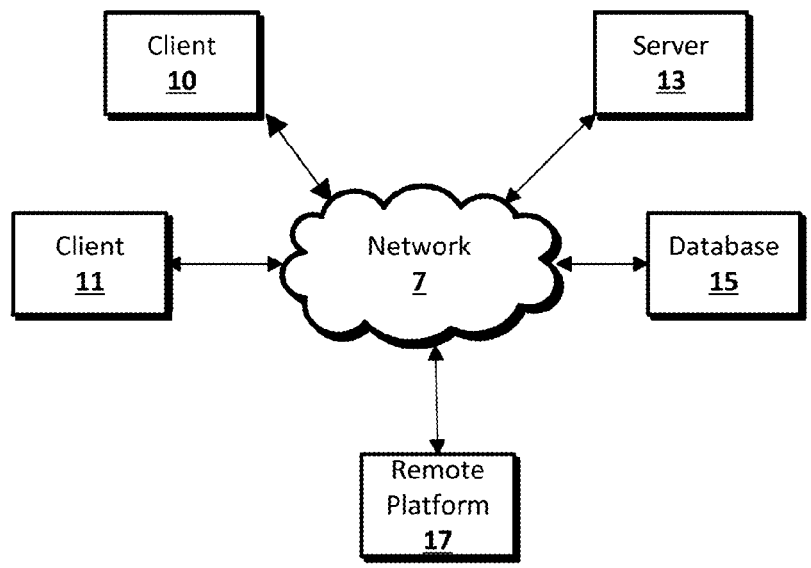
FIG. 5 shows a network configuration according to an implementation of the disclosed subject matter.

FIG. 5 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's provided input, a user's geographic location, and any other similar data associated with a user), or to control whether and/or how to receive data from a provider that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
   determining, by a processor of a first mobile device, a safety condition of a vehicle;
   disabling, by the processor, at least one function of the first mobile device associated with a driver of the vehicle and connected to an infotainment system of the vehicle, based on the determined safety condition;
   receiving, by the processor, a request from a second mobile device to provide an instruction to the first mobile device;
   determining, by the processor, that the second mobile device has permission to provide the instruction to the first mobile device;
   receiving, by the processor, the instruction from the at least one second device; and
   controlling the infotainment system according to the instruction received from the second mobile device.

2. The method of claim 1, further comprising activating, by the first mobile device, a sharing mode that grants an ability to control at least one application on the first mobile device to at least one user with the second mobile device.

3. The method of claim 2, further comprising receiving an indication of the at least one user.

4. The method of claim 2, further comprising receiving an indication of the second mobile device.

5. The method of claim 1, further comprising emitting a feedback by at least one of the vehicle and the first mobile device that indicates the instruction provided by the second mobile device was received by the first mobile device.

6. The method of claim 1, further comprising providing an indication that a display has been controlled based on the instruction received from the second mobile device.

7. The method of claim 1, further comprising providing an indication to the second mobile device that the instruction was received from the second mobile device.

8. The method of claim 1, wherein the infotainment system is a standalone device configured to be separated from the vehicle during use of the vehicle.

9. The method of claim 1, wherein the instruction is selected from the group consisting of: a URL, an address, a location, an application launch, a point of interest, and a user interface command.

10. The method of claim 1, further comprising receiving, by the first mobile device, a request from the second mobile device to access at least one of a function and a computer readable memory of the first mobile device.

11. A method, comprising:
sending a credential to a first mobile device, by a second mobile device associated with a passenger of a vehicle, that the first mobile device uses to authenticate the second mobile device to the first mobile device, wherein the first mobile device is connected to the vehicle and is responsible for driving a display of an infotainment system and wherein the first mobile device is associated with a driver of the vehicle;
receiving, by the second mobile device, an indication that the second mobile device is authenticated to the first mobile device, the indication including a display of a notice that indicates that the first mobile device is in proximity to the second mobile device;
sending an instruction to the first mobile device, wherein the instruction causes the first mobile device to control the display of the infotainment system based on the instruction.

12. A system, comprising:
a first mobile device associated with a driver of a vehicle, comprising a display and a processor, wherein the first mobile device is configured to be connected to the vehicle and is responsible for driving a display of an infotainment system, the processor configured to:
determine a safety condition of the vehicle;
disable at least one function of the first mobile device based on the safety condition;
receive a request from a second mobile device to provide an instruction to the first mobile device;
determine that the second mobile device has permission to provide the instruction to the first mobile device;
receive the instruction from the second mobile device; and
control a display of the infotainment system based on the instruction received from the second mobile device.

13. The system of claim 12, the processor further configured to activate a sharing mode that grants an ability to control at least one application on the first mobile device to at least one user with the second mobile device.

14. The system of claim 13, the processor further configured to receive an indication of the user.

15. The system of claim 13, further configured to receive an indication of the second mobile device.

16. The system of claim 12, the processor further configured to emit a feedback by at least one of the vehicle and the first mobile device that indicates the instruction provided by the second mobile device was received by the first mobile device.

17. The system of claim 12, the processor further configured to provide an indication that the display has been adjusted based on the instruction received from the second mobile device.

18. The system of claim 12, the processor further configured to provide an indication to the second mobile device that the instruction was received.

19. The system of claim 12, wherein the infotainment system is a standalone device that can be separated from the vehicle during use of the vehicle.

20. The system of claim 12, wherein the instruction is selected from the group consisting of: a URL, an address, a location, an application launch, a point of interest, and a user interface command.

21. The system of claim 12, the processor further configured to receive, by the first mobile device, a request from the second mobile device to access at least one of a function and a computer readable memory of the first mobile device.

* * * * *